US005426282A

United States Patent [19]

Humble

[11] Patent Number: 5,426,282

[45] Date of Patent: Jun. 20, 1995

[54] SYSTEM FOR SELF-CHECKOUT OF BULK PRODUCE ITEMS

[76] Inventor: David R. Humble, 2696 Emerald Way North, Deerfield Beach, Fla. 33441

[21] Appl. No.: 102,763

[22] Filed: Aug. 5, 1993

[51] Int. Cl.[6] ........................ G06F 17/00; G07C 11/00

[52] U.S. Cl. ..................................... 235/383; 364/466; 186/61

[58] Field of Search .................... 235/383; 364/464.01, 364/466; 186/61

[56] References Cited

U.S. PATENT DOCUMENTS

| | | | |
|---|---|---|---|
| 4,676,343 | 6/1987 | Humble et al. | 235/383 |
| 4,792,018 | 12/1988 | Humble et al. | 235/383 |
| 4,964,053 | 10/1990 | Humble | 235/383 |
| 5,083,638 | 1/1992 | Schneider | 235/383 |

FOREIGN PATENT DOCUMENTS 2161631A 1/1986 United Kingdom .

*Primary Examiner*—Davis L. Willis
*Assistant Examiner*—Peter J. Rashid
*Attorney, Agent, or Firm*—Eckert Seamans Cherin & Mellott

[57] ABSTRACT

A retail checkout station for purchaser self-checkout is coupled to a service terminal with a video monitor directed at the checkout. The service terminal preferably services a number of checkouts. Product codes can be downloaded from a remote location to a checkout presented with a product lacking a product code barcode label, such as an item of bulk produce. A product database having product price information stored in a memory is normally indexed to product codes which are scanned in, and also is at least partly indexed by product identity information. The checkout station can have an electronic scale for determining the weight of a product. A video image of an uncoded product in the security zone is captured by a camera and displayed on a video monitor which is viewable by store personnel. A keyboard associated with the video monitor permits the store personnel to enter a product code corresponding to the product displayed on the video monitor. The service terminal function can be met by cashiers at idle checkout lanes or payment stations. The data processor accesses product price information from memory, and if necessary calculates a purchase price of the product by weight. The purchase price is added to the price of other consumer purchases for payment by the purchaser.

10 Claims, 4 Drawing Sheets

SYSTEM FOR SELF-CHECKOUT OF BULK PRODUCE ITEMS

BACKGROUND OF THE INVENTION

1. Field of the Invention

The invention relates to the field of apparatus for self-checkout of products purchased by a consumer, and more particularly, to an apparatus for self checkout of produce items selected from a bulk source which have not been bar coded.

2. Prior Art

Modern retail stores such as supermarkets generally have checkout lanes with equipment for optically scanning bar codes affixed to the products being purchased. The scanning equipment includes a scanned laser for illuminating the bar code, a bar code reader for receiving light reflected from the bar code and converting the code to numeric or alphanumeric data, and a processor for retrieving stored data indexed to the product identity defined by the bar code.

Some of the checkout lanes may be designated for self-checkout. These permit a purchaser to self-scan his or her purchases using a substantially unattended checkout apparatus, thus reducing the number of store personnel that must be dedicated to checkout lanes. Supermarkets especially view self-checkout as desirable because these stores are particularly sensitive to labor costs due to their typically low profit margins.

For most efficient operation, self-checkout requires that bar codes be affixed to all items in the store. Items without a bar code require special intervention by store personnel, and this is counter-productive to the goal of self-checkout which is to decrease requirements on the time of store personnel. It is almost universal for prepackaged items to have a bar code applied by the manufacturer, and self-checkout of these prepackaged items is not a problem. However, produce items and the like, for example, which are selected for purchase from a bulk supply, present problems because only approximately 15% of produce items are bar coded upon delivery to the supermarket. Moreover, bulk produce items are often priced by weight, and it may be impractical to fully encode the stock.

In a store having equipment for self-checkout, bulk produce may be handled in several different ways enabling a product identity code to be associated with the produce item. Firstly, produce items may be prepackaged by store personnel who apply a bar code label which is translated into an item description and price by the self-checkout equipment. This method has the drawback of requiring additional labor in the produce department, namely to package and possibly to weigh the produce items. Further, consumers generally prefer to select Individual produce items from bulk, so that all the items are in accordance with the consumer's desires as to size, ripeness or the like. Retailers are reluctant to interfere with this consumer preference.

In another method for self-checkout of bulk produce items, produce items which have been selected by a consumer for purchase are presented to store personnel who then weigh the produce, determine a price and apply a bar code label which can be scanned to determine identity and price. A station for this procedure may be located in the produce department or near the checkout area at a front of the store. This system still requires additional labor on the part of store personnel, and also requires a time consuming additional step for the consumer to have the produce marked.

A further method involves applying a generic bar code label identifying the item by general description (e.g., a type of fruit). This information is applied by the produce department. The consumer scans the bar code at the self-checkout machine and places the produce on a special "scanner scale". The produce is weighed and priced automatically by the self-checkout machine, which references a stored price per unit of weight, and calculates the amount debited to the customer. This method still requires that store personnel maintain supplies of bar code labels for the produce. Further, bar code labels are difficult to apply to certain produce items, consumers may forget to apply the labels or wish not to apply adhesive labels to their food items, etc. For these and various other reasons, produce items reach the self-checkout machine without labels attached.

Another method for handling bulk produce items is disclosed in patent application Ser. No. 07/185,167, now abandoned, and the continuation thereof Ser. No. 07/420,685, now U.S. Pat. No. 4,964,053, granted Oct. 16, 1990, owned by CheckRobot, Inc. The method involves displaying produce icons on a video screen at the self-checkout station, whereby the consumer inputs the type of produce by selecting the corresponding icon on the display screen. This method is limited by the size of the display screen and the limited number of produce icons which can be effectively displayed on the screen, particularly since different produce items may have a similar appearance at least by outline (e.g., apples vs. plums, red grapes vs. concords, etc.).

The present invention overcomes these problems by providing a system for purchase checkout of bulk produce items which does not require that a bar code label be applied to the produce before checkout, and permits self-checkout of a full range of produce items. This is accomplished by providing a means for store intervention wherein a limited number of operators can intervene electronically to determine the nature of a product and to download pricing data to any of a number of checkout terminals which are operated by consumers in a self-checkout mode.

SUMMARY OF THE INVENTION

It is an object of the invention to provide a system for purchaser self-checkout of a product selected for purchase from a bulk source.

It is another object of the invention to provide a system for purchaser self-checkout which is simple and easy to use.

It is a further object of the invention to provide a system for purchaser self-checkout which does not require personal intervention of store personnel.

It is yet another object of the invention to provide a system for purchaser self-checkout which provides security against purposeful and accidental mispricing of items being purchased.

These and other objects are accomplished by a system including a checkout station for purchaser self-checkout of a product selected for purchase from a bulk source. The system includes a product database having product price information stored in a memory and normally indexed to product codes which are provided on the products by barcode labels, but also at least partly indexed by product identity information. The checkout station includes a security zone having a weighing means disposed for determining a weight of a product in the security zone. A video image of the product in the security zone can be captured by a camera and displayed on a video monitor which is viewable by store personnel. A keyboard associated with the video monitor permits the store personnel to enter a product code corresponding to the product displayed on the video monitor. The product code entered by the store personnel provides product identification to a processor which accesses product price information from memory, and if necessary also the weight of the product, to calculate a purchase price of the product. The purchase price is transmitted to the terminal, where it is added to the price of other consumer purchases for payment by the purchaser.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
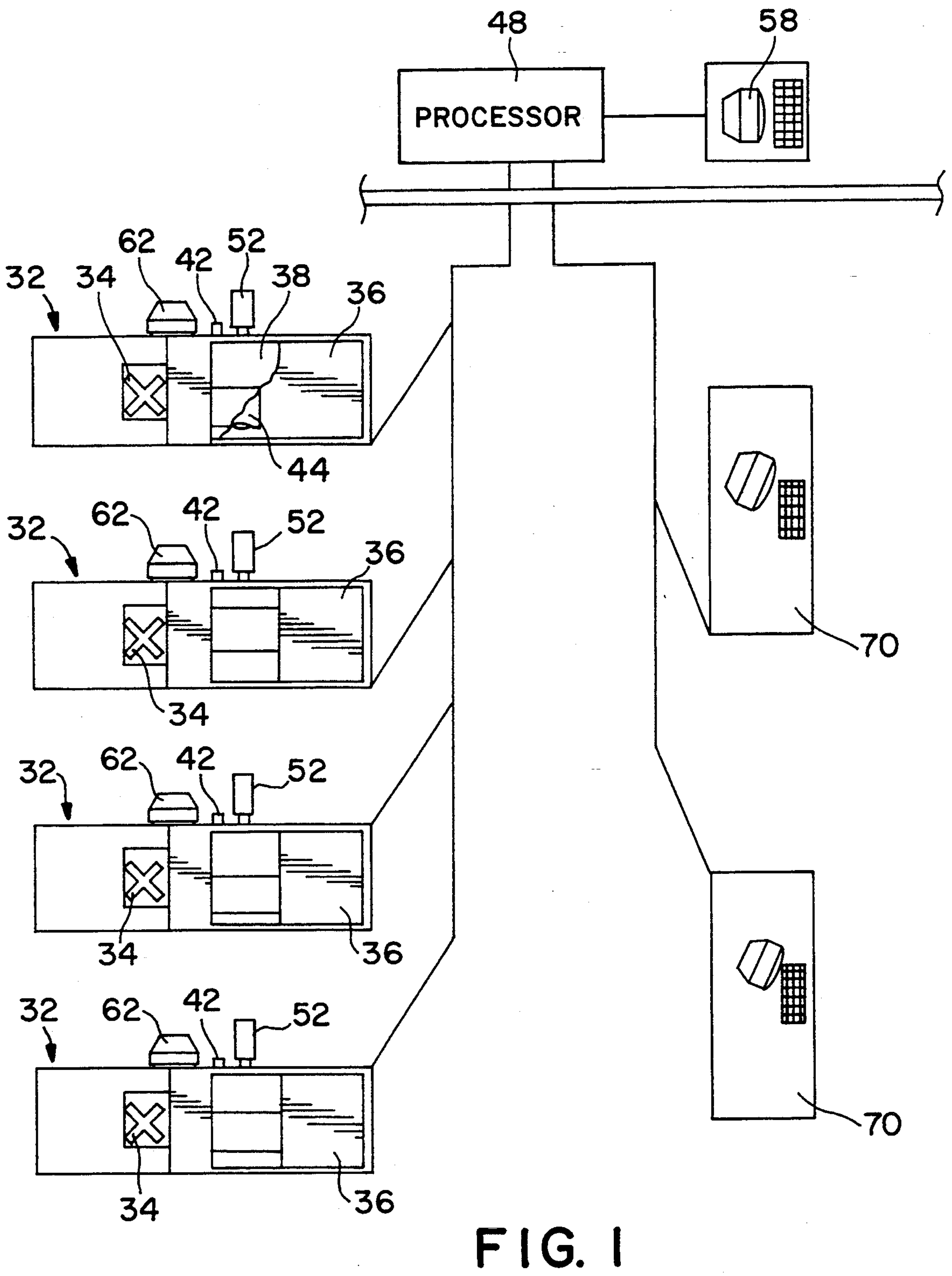
FIG. 1 is a plan view of a checkout arrangement for a retail store according to the invention.
Figure 4:
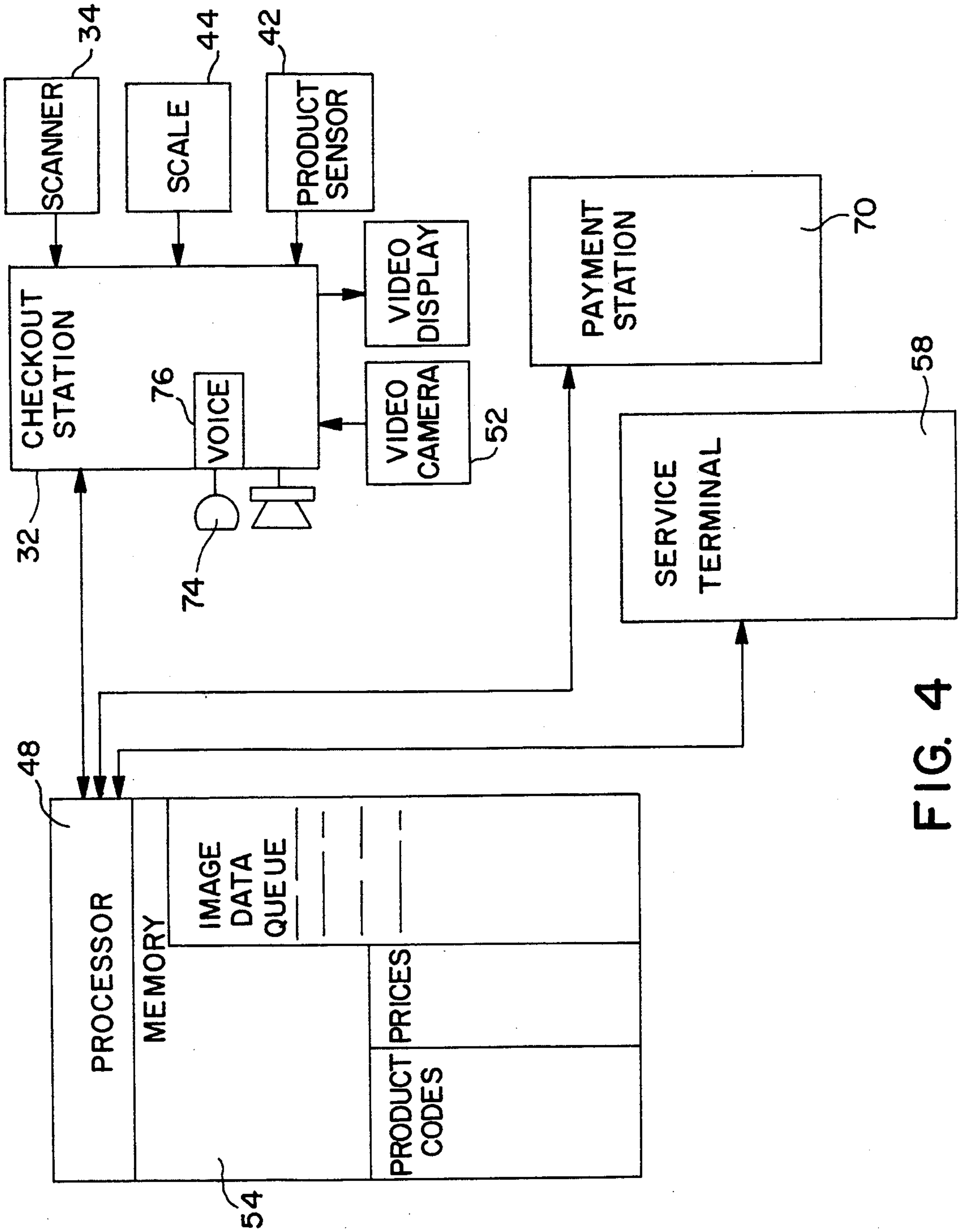

A system for purchaser self-checkout of products sold at retail is shown in FIGS. 1 and 4. The products preferably are barcode labeled for the most part, but the products also include those selected for purchase from a bulk source or otherwise presented for purchase without accompanying barcode labels. At least one self-checkout station 32 is included in the store, shown more completely in FIG. 2, for operation by the customer without substantial assistance from store personnel. For many of the products presented for purchase, the product is simply detected by a scanner 34, of known variety and having a scanned beam which intersects the path of the product and reads the barcoded UPC identity code. This code is reported to the store computer system, which has a memory (FIG. 4) including product code information indexed to stored price information. The price as thus determined is then added to the total for the transaction. However, some products such as produce items are not bar coded and/or are priced per unit of weight.

Figure 2:
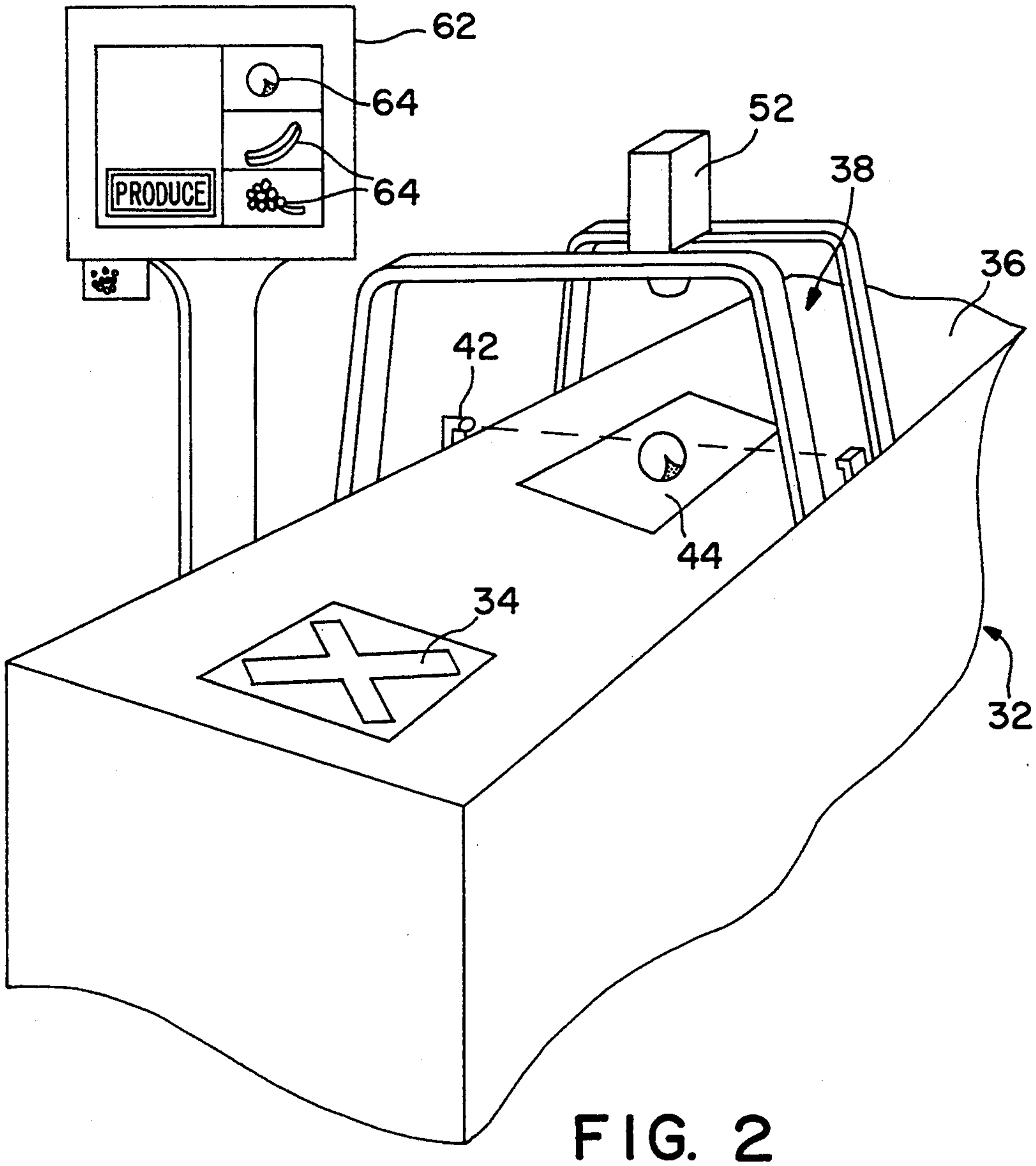
FIG. 2 is a partial perspective view showing a self-checkout terminal as in FIG. 1.

Referring to FIGS. 1 and 2, the self-checkout station 32 preferably has a moving conveyor 36 which transports products placed upon the conveyor by a purchaser to a security zone 38 at a portion of the self-checkout station 32. When a product enters the security zone 38, a sensor 42 detects the product and commands the moving conveyor to stop at a point where the product is disposed on a weight scale 44. The weight scale 44 includes weighing means for determining a weight of the product to an accuracy which complies with government standards. The weight of the product is sensed and transmitted to a processor 48 for a price calculation as hereinafter described.

A camera means such as video camera 52 is disposed for capturing a video image of the product in the security zone 38. The image (as well as the weight) may be recorded when the transport is stopped, or may be recorded "on the fly." The video image is either stored temporarily in a memory 54 or transmitted immediately to a video monitor 58 which is disposed for displaying the video image to one or more store personnel. This action can be triggered whenever a product is sensed without a UPC barcode label by any of the self-checkout stations 32 in the store. The centralized video monitor 58 is associated with a service terminal coupled to the computer system, enabling the store personnel to enter identity information corresponding to the product appearing in the recorded image.

Preferably, the consumer is also involved in entering product identity information, and the consumer-entered information is used by default in the event the store personnel cannot respond quickly enough to the need for intervention. Alternatively, the store personnel can function primarily for security, simply verifying the consumer-entered information, either for each unlabeled product or on a sampling basis. For the consumer's use at the self-checkout station 32, a video screen 62 is disposed for displaying produce information for selection by the purchaser to identify the product. The screen 62 may display a variety of produce icons or images, and is preferably a color video display. The purchaser selects the produce icon or image 64 corresponding to the produce in the security zone by touching the appropriate icon 64 on a touch screen input form of display terminal or using a conveniently located selection button. The screen will then display a request for the number of units purchased. The purchaser inputs the number of units purchased, again by touching the display screen or by using a button. After the purchaser has input the requested information, the conveyor restarts and transports the next produce item into the security zone 38.

The processor 48 for the self-checkout station can store in memory 54 a file of information including a description of the produce item, a digitized picture of the item, the weight of the item if required, the item count and lane identification number. This can be referenced by store personnel either at centralized monitor 58 or at another store operated terminal, concurrently with the transaction, or later in the event the image is stored. Normally this information is reviewed before the customer tenders payment, either by electronic means at the self-checkout station 32, or at a payment station 70 operated by store personnel and likewise intended to service a plurality of the checkout lanes.

Centralized store intervention occurs in one of three ways. The produce item may be processed in "real time", while the item is stopped in the security zone 38 on the conveyor belt 36, when store personnel view and process the item from a terminal remote from the checkout. The produce item may be processed "off line," with store personnel viewing and processing the item sometime during the ringing of the order and before the order is completely scanned. The produce item(s) also may be processed by the cashier at the payment station 70, using information stored by the data processor 48. In that case the cashier verifies the recorded data and adds the produce items to the subtotal transaction in the same way coupon credits or additional late purchases are added, after a consumer leaves the self-checkout lane with a subtotal receipt.

In all three cases, the information about a specific produce item previously described, is available for verification or is indicated as already verified by store personnel, at any of the payment stations 70.

Figure 3:
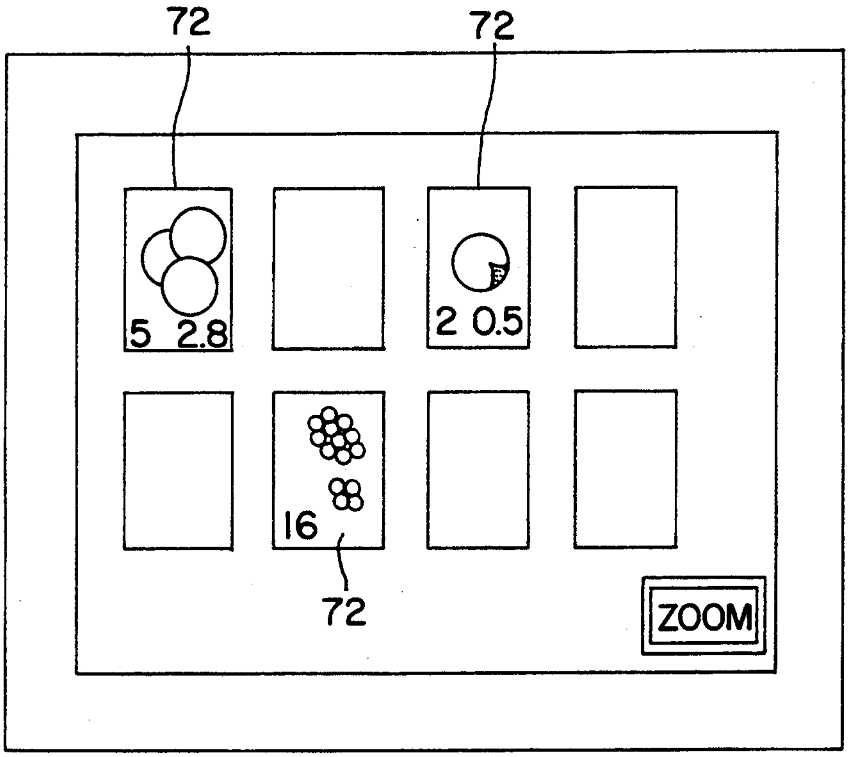
FIG. 3 is an elevation view showing a readout of a video image at a service terminal or payment terminal; and, FIG. 4 is a schematic block diagram showing the functional aspects and interconnection of elements according to the invention.

Once the file on the produce item is recorded, the video information can be digitized and stored as a compressed digital image record. When store personnel verify the information, for example at the cashier or payment station 70, information from the lanes is converted into pictures 72, as shown in FIG. 3, including a representation of the item which is displayed to the cashier with a lane identification number and supporting text. The video image of the produce item can appear in a box that takes up a portion of the screen. Several images may appear at the same time as in FIG. 3. They will appear on a prioritized basis and when one item is processed, the screen is rearranged to maintain an orderly queue. If the small image is not recognizable by the cashier, a "zoom" command is effected by an input from the cashier, whereupon the image display software enlarges the picture from one of the queued transactions to fill the screen for better identification.

The image of the item is visually identified by the cashier or other store personnel and the code identifying the item is either verified or entered by the store personnel at that point. For example, when the customer arrives at the cashier station to complete a transaction which has been opened by the customer scanning a plurality of items at the self-checkout 32, the operating system of the data processor 48 flags the transaction as including uncoded items such as produce, for example some onions. The operating system converts the digitized data into an image 72 displayed on the cashier's screen. The cashier sees an onion on the screen, enters a code number for onions and touches the screen to complete the process. The cashier normally remembers code numbers for most produce items, but also can select a listing of code numbers accompanied by text descriptions or images. Alternatively, the code can be obtained by looking the item up on a printed list.

The time required by the cashier to enter the produce item information is less than when the item is processed in conventional lanes. In conventional lanes, the item is weighed by the cashier and the amount of purchase is then entered into the electronic cash register. According to the invention, at least some of the necessary information is collected automatically. Some of the information is also provided by the customer. If desired, for example to accommodate heavy traffic at peak times, the store policy can be simply to accept the data entered by the consumer, which in almost all cases can be expected to be accurate. The consumer may be unfamiliar with the self-checkout. The consumer can have the option to decline to enter information, in which event the cashier can handle this function for only those transactions when necessary.

As shown in FIG. 4, all the stations are coupled in data communication throught the processor 48. The image can also be transferred to other stations in the store designated to handle produce. In the event a cashier is idle at one of several payment stations 70, or perhaps a cashier operating an attended checkout lane is idle, that cashier can attend to the verification and data entry functions for the self-checkout terminals 32. In this manner, the work is shared and throughput is not affected adversely. Alternatively, or in addition, a special cashier station could be located in the produce department or the front-end office, designated for this purpose alone.

The identity code for an unlabeled product or a produce item entered by the cashier or the like can be the same or different than a UPC code corresponding to the product. Once the identification code is entered, it is looked up in a product data base in memory 54, where unit price information is stored and indexed to the identification codes. The self-checkout system now has all of the information to price the item for the consumer and either to transfer the information to the lane where other items in the consumers purchase are being recorded, or to add the information later.

Assuming the system is arranged to await verification so that complete information is available before the consumer leaves the self-checkout station, the produce item can remain stopped on the conveyor belt 36 while waiting to be priced. Once the confirmed identification and price information is received by the lane, the item is then priced, and the price is voiced and/or displayed to the consumer. The conveyor restarts and the self-checkout machine is ready for the next item.

Conventional self-checkout security methods can be applied at the appropriate time, after the item is identified. For example, product dimensions, weight, color or other aspects can be sensed and compared to expected characteristics of a product having the corresponding code. Items based on quantity are handled the same way, with the exception that the consumer has entered the quantity of items to be purchased.

Preferably, items can be processed "off line", in which case the procedure is the same with the exception that the conveyor may be restarted as soon as the image and weight of the items have been captured. The self-checkout machine 32 is then ready for the next item and the produce item or the like is in a queue waiting to be verified by store personnel. The item is processed when time is available, at latest when the customer arrives at the cashier station 70 to close the transaction by tendering payment.

Assuming one or more additional items are placed in the self-checkout machine 32 before store personnel identify the produce item and it is priced and processed, verification of the item and entry of the price occurs out of sequence with the other items scanned. The later appearance or enunciation of a price on the screen may confuse the consumer as to which product is being priced. Accordingly, the consumer preferably is advised by the self-checkout machine in voice or graphics, as to the identity and sequence order of any product which is later priced, to avoid such confusion.

As soon as store labor is available, the item is identified and processed and appears on the self-checkout lane screen 62. Various methods may be used to alert store personnel to items which have remained in the queue too long. After a time-out, the item image may start to "blink", a warning sound may sound in the cashier station 70, or store management otherwise may be made aware so they may add additional resources.

In the case of items being processed at the cashier station 70, the procedure is the same for processing at a dedicated service terminal, except it is possible that a consumer may process all items to be purchased using the self-checkout end the transaction except for payment, and proceed to the cashier station before store personnel have time to intervene and process the produce items. The fact that the information is incomplete can be noted on the point of sale or register tape the consumer receives when leaving the self-checkout machine 32, or can be noted on the cashier display 70 beside the tentative total amount of the purchase.

In this case, the cashier processes the produce items before totaling the purchase. The data processor 48 associates the product information with the transaction, and can present each of the produce items to the cashier automatically, thus removing them from the queue of unprocessed items. All the produce items related to the order are thus completed to total the transaction, even if this involves processing them out of turn. The produce item prices are added to the customer subtotal amount the same as other items were added, or coupons credited, on the self-checkout machine. The produce items processed by the cashier are shown on the "total" receipt given to the consumer, which supersedes the tentative total on the point of sale tape.

Image processing systems are available that can automatically recognize items through pattern analysis. Although these systems are expensive, and the supermarket presents a large number of variables, it is possible to employ image processing software and pattern recognition systems in self-checkout to identify all items. In this case, the pattern recognition system identifies the item and functionally replaces the scanner 34. The pattern recognition system can also be used to discriminate product identity codes, when available. The pattern recognition system can be used to supplement or to replace image verification by store personnel.

Pattern recognition is appropriate in identifying produce, because there are relatively few types of items involved. In the event a pattern recognition system is provided, it preferably is the primary identifying system, with store personnel providing backup to identify products which are not readily identified by the automatic system.

A voice produce processing system may be included as an alternative or additional input means. A microphone 74 is positioned conveniently for the consumer and coupled to a voice recognition system 76 having the capability of discerning the voice pattern of all of the produce items in the store and the quantity of items purchased. The voice recognition system includes, a data base of stored voice patterns of the produce items in the store, as well as patterns for numbers and basic commands that may be used in the checkout of produce.

As the consumer starts to checkout a produce item, the consumer announces a description, such as "navel oranges". If the items is priced by unit, the consumer includes the number, e.g., "six navel oranges". If the consumer says "navel oranges" without expressing a quantity and the oranges are priced by quantity, the self-checkout machine prompts, e.g., "quantity?" to obtain this information. The consumer then places the item on the conveyor. The voice recognition system identifies the item as a produce item and transmits the proper look up code to the self-checkout database.

Once the item is recognized (by voice) as a produce item, the conveyor belt starts, moving the item to a specific point in the self-checkout security zone, which can be partly enclosed in a tunnel. At that specific point, the conveyor belt stops. The price per unit or price per pound is then sent to the self-checkout system 32. In weight mode, the item is weighed and a processor (either the system processor 48 or a processor at the self-checkout lane) calculates the total price and displays it on the screen 62, as other items are displayed. During this process, the self-checkout machine states in an electronic voice "six naval oranges, one twenty nine." Repeating the consumer input confirms the purchase and provides a measure of security.

Once the item is priced and displayed, one or more of the security checks are made if desired, and the item then proceeds to the bagging area.

According to the invention, a limited number of words need to be recognized as spoken by a large number of different people. In the event the voice recognition means are unable to recognize words spoken by a given customer, a supplemental method of inputting information is preferably included. For example, if the voice recognition system properly identifies "navel oranges" but not the number "six," a keypad or other input means can enable the customer to enter the information is a less esoteric (and less convenient) manner than by voice.

The invention having been disclosed, variations will now be apparent to persons skilled in the art. Whereas the invention is intended to encompass not only the preferred examples, reference should be made to the appended claims rather than the foregoing discussion of preferred examples, in order to assess the scope of the invention in which exclusive rights are claimed.

I claim:

1. A self-checkout system for operation by a customer to process a number of products, including unlabeled products, through a retail checkout procedure, the system including a product code scanner coupled to a data processor and a memory operable to associate scanned product codes and prices and to accumulate a transaction total, the system comprising:

a video camera disposed at a scanning checkout station, operable to record and stored in memory a video image of products passing the product code scanner;

at least one display disposed at a payment station apart from the scanning checkout station operable to retrieve and display said video image from said memory at the payment station, the display being associated with a data input means coupled to the data processor for entering an identity code corresponding to a product appearing in the video image lacking a product code, wherein a product code can bee entered remotely at said payment station after completion of scanning and prior to payment via the data input means in place of the scanned product codes, to be accumulated in the transaction total.

2. The self checkout system according to claim 1, further comprising a plurality of checkout stations coupled to the data processor over a network, and wherein the data processor is operable switchably to couple the stored video image of individual checkout stations to the display, and to associate the remotely entered product codes with transactions at said individual checkout stations.

3. The self checkout system according to claim 2, comprising a plurality of payment stations, and wherein the video image can be displayed from said memory at any of the payment stations.

4. The self checkout system according to claim 2, wherein the video image is digitized prior to being stored.

5. The self checkout system according to claim 1, further comprising customer-operable input means at the checkout stations, for entering at least one of product identity and quantity information, and wherein the product code is entered remotely for product identities and quantities which do not match the video image displayed from the memory.

6. The self checkout system according to claim 5, wherein the customer-operable input means includes at least one of a keyboard, touch sensitive screen and voice operated input.

7. The self checkout system according to claim 5, wherein the customer-operable input means includes a touch sensitive screen coupled to the data processor, operable to display images of products for selection by the customer.

8. A system for purchaser self-checkout of a product selected for purchase from a bulk source, comprising:

a product database including product price information;

a checkout station including a security zone;

conveyor means for transporting the product through the security zone;

weighing means disposed for determining a weight of a product in the security zone;

sensor means for detecting the product in the security zone and temporarily stopping the conveyor means when the product is disposed on the weighing means;

camera means disposed for capturing a video image of the product in the security zone;

memory means for storing said video image for later retrieval;

video monitor means disposed at a payment station for displaying the video image to at least one of store personnel after the purchaser has exited the checkout station and entered said payment station;

keyboard means associated with the video monitor means for the at least one of store personnel to enter a product code corresponding to the product displayed by the video monitor means, to provide product identification;

processor means for operating on the product identification, the weight and the product price information to calculate a purchase price of the product; and, means for transmitting the purchase price to payment station.

9. The system according to claim 8, wherein the keyboard means includes means for entering a unit count of the product, and the processor means further operates on the unit count.

10. The system according to claim 8, wherein said at least one of store personnel can selectively retrieve video images from the memory.

* * * * *